United States Patent Office 3,429,230
Patented Feb. 25, 1969

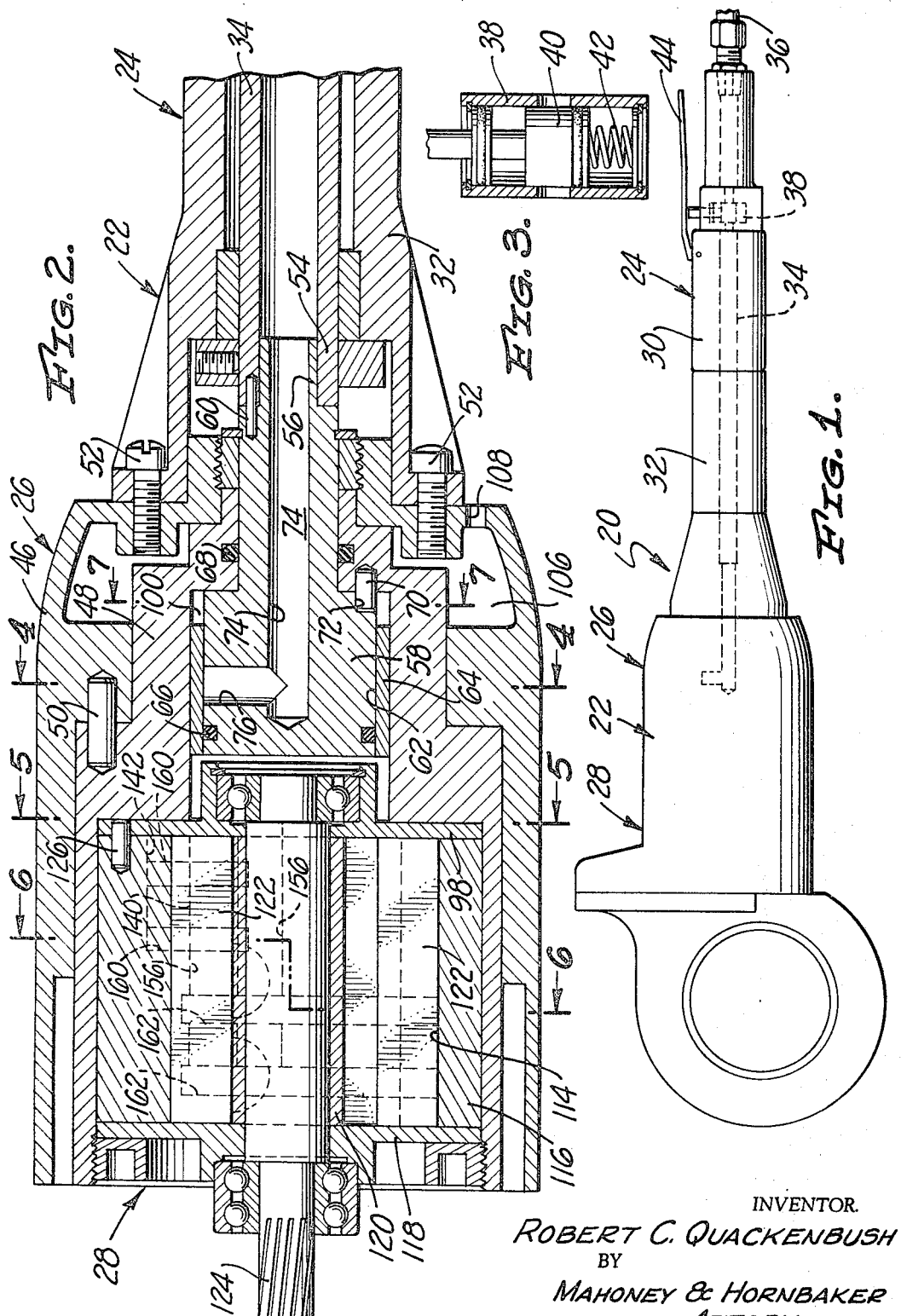

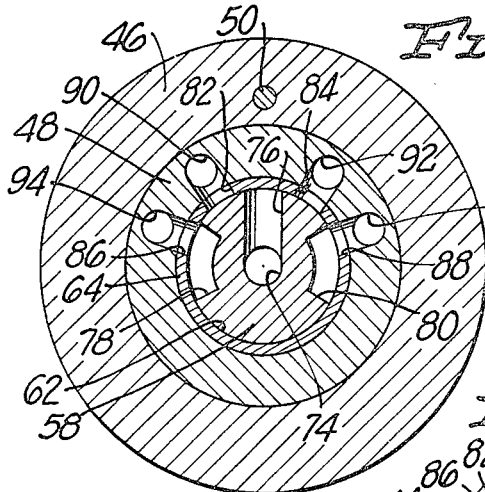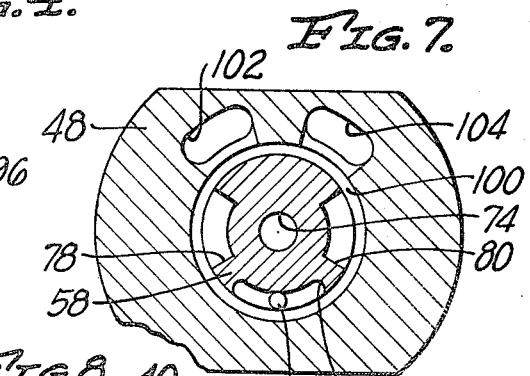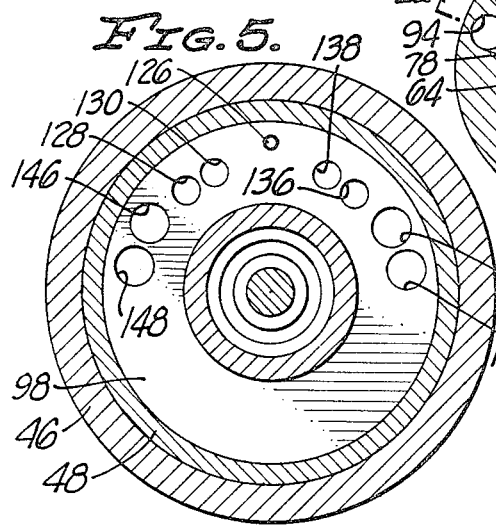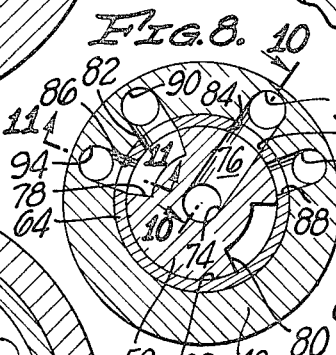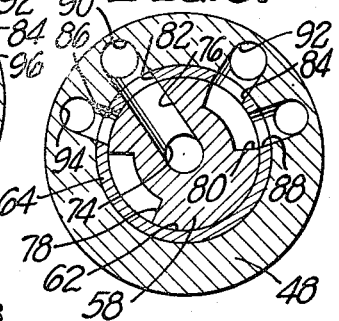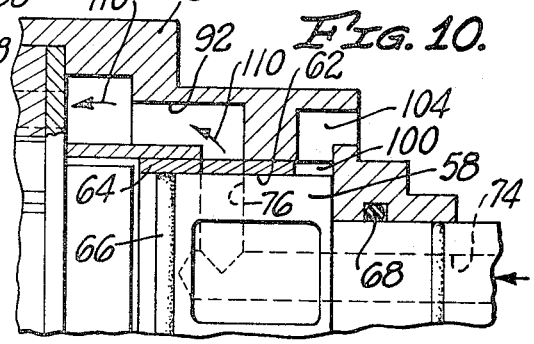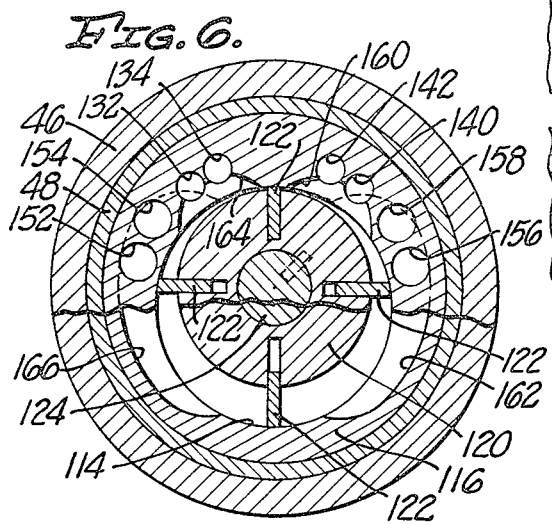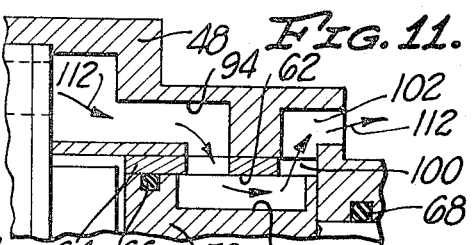

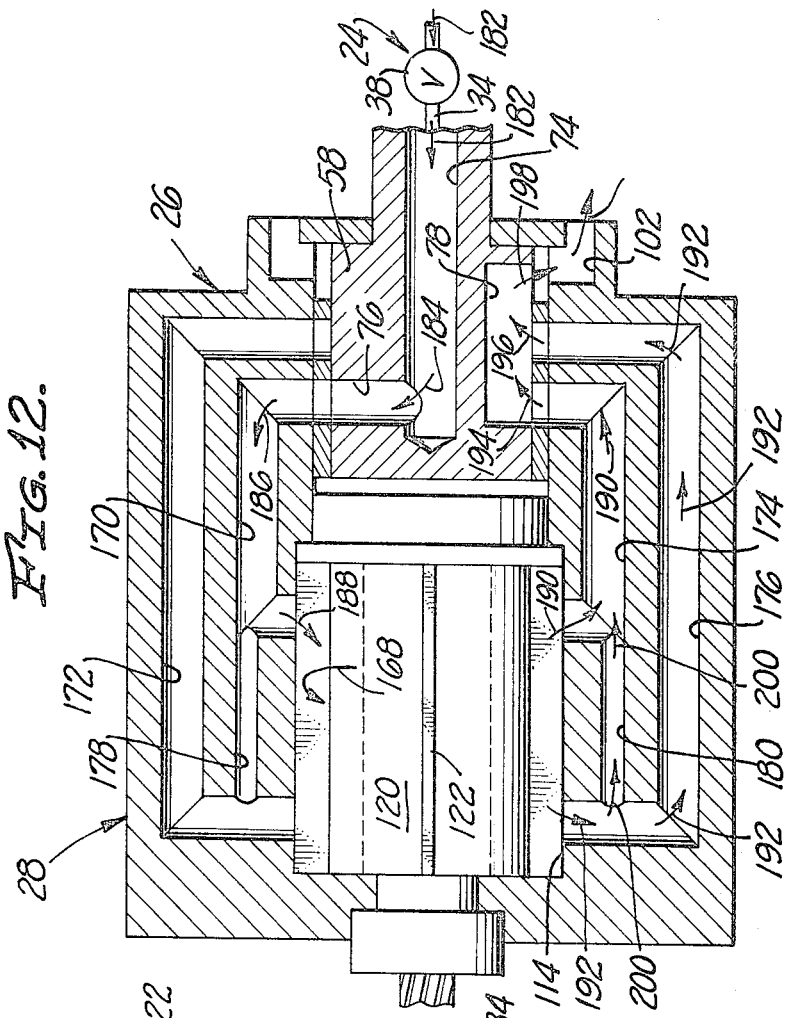

3,429,230
FLUID DRIVEN MOTOR
Robert C. Quackenbush, Glendale, Calif., assignor of one-half to Arthur B. Quackenbush, Glendale, Calif.
Filed Nov. 28, 1966, Ser. No. 597,418
U.S. Cl. 91—121        12 Claims
Int. Cl. F01c *1/30, 21/12*

ABSTRACT OF THE DISCLOSURE

A fluid inlet and a fluid exhaust are connected to one side of a rotary valve, and first and second pairs of fluid passages are connected between the other side of the valve and a rotor chamber of a reversible rotary motor. Movement of the valve body to a first position connects the fluid inlet through one of the first pair of fluid passages into the rotor chamber, while sealing off the other of said first pair at the valve and connecting both of the second pair of fluid passages to the fluid exhaust. Movement of the valve body to a second position connects both of the first pair of fluid passages to the fluid exhaust, one of the second pair of fluid passages to the fluid inlet and seals off the other. The first pair of fluid passages opens into the rotor chamber circumferentially spaced from the second, and one of each pair opens into the rotor chamber axially spaced from the other, although both passages of each pair are connected adjacent the rotor chamber.

This invention relates to a fluid driven motor and, more particularly, to a fluid driven motor incorporating a rotatable motor element having a plurality of blades adapted to be subjected to the action of a driving fluid, such as compressed air, or the like.

One of the major problems encountered in the design and operation of conventional fluid motors is the problem of exhausting spent fluid from the motor chamber to the ambient air. The problem is attributable to the fact that on the exhaust side the rotor element must serve as a pump to expel the spent fluid and, therefore, considerable energy is expended by the rotor element during the exhaust of the spent fluid.

Conventional fluid motor constructions customarily incorporate separate exhaust passages to exhaust the spent fluid or utilize the inlet passages by reversing the flow through valve means. However, the back pressure encountered with conventional fluid motor constructions substantially reduces the efficiency of conventional fluid motor constructions because of the energy expended in expelling the spent fluid to the ambient air.

It is, therefore, an object of my invention to provide a fluid motor which is characterized by the fact that the spent fluid is expelled from the motor chamber with a minimum power loss because of the reduced back pressure encountered in the exhaust phase.

Another object of my invention is the provision of a fluid motor which incorporates a motor chamber and a valve chamber maintained in fluid communication with each other by first inlet and outlet passage means at one side of the motor chamber and second inlet and outlet passage means at the other side of the motor chamber. During the operation of the motor, one side of the motor chamber is subjected to the flow of pressure fluid through the inlet passage means associated with said one side, while the outlet passage means is blocked off by the associated valve member and the other side of the motor chamber is connected to exhaust through both the inlet and outlet passage means of said other side in communication with an exhaust port in said valve member.

Therefore, the exhaust capacity of the motor on both sides of the valve chamber is greater than the inlet capacity of said motor and, consequently, reduced back pressure is encountered at the exhaust side of the motor chamber. Naturally, since less energy is dissipated by the motor to exhaust the spent fluid, the power output of the motor is greatly increased.

Another object of my invention is the provision of a fluid motor of the aforementioned character wherein the first and second inlet and outlet passages are arranged in parallel and the first inlet and outlet passages are continually in communication with each other. The second inlet and outlet passages are also continually in communication with each other so that, when either the first or second inlet and outlet passages are placed in series with the outlet port of the associated valve member, exhaust fluid will be exhausted from the motor chamber through both the inlet and outlet passages simultaneously to substantially reduce the back pressure in said motor chamber and to materially increase the power output of the fluid motor.

Other objects and advantages of the invention will be apparent from the following specification and the accompanying drawings which are for the purpose of illustration only, and in which:

FIG. 1 is a side elevational view of a typical embodiment of the teachings of my invention;

FIG. 2 is a longitudinal, sectional view of the control valve and motor portion of the embodiment of FIG. 1;

FIG. 3 is a vertical, sectional view of the air shut-off valve incorporated in the aforesaid embodiment;

FIG. 4 is a vertical, sectional view taken on the broken line 4—4 of FIG. 2;

FIG. 5 is a vertical, sectional view taken on the broken line 5—5 of FIG. 2;

FIG. 6 is a vertical, sectional view taken on the broken line 6—6 of FIG. 2;

FIG. 7 is a vertical, sectional view taken on the broken line 7—7 of FIG. 2;

FIG. 8 is a vertical, sectional view similar to FIG. 4, but of merely the intermediate housing and control valve rotor illustrating the location of the valve rotor in the position in which it is located when the rotor of the air motor is rotated in a clockwise direction, as viewed from the handle end or counterclockwise, as viewed from the motor drive shaft end;

FIG. 9 is a view similar to FIG. 8 illustrating the location of the valve rotor when the rotor of the air motor is rotated in a counterclockwise direction, as viewed from the handle end or clockwise, as viewed from the motor drive shaft end;

FIG. 10 is an enlarged, fragmentary, sectional view taken along the broken line 10—10 of FIG. 8 and showing the inlet air flow pattern through the control valve section to the motor section when the valve rotor is in the position of FIG. 8;

FIG. 11 is an enlarged, fragmentary, sectional view taken along the broken line 11—11 of FIG. 8 and showing the exhaust air flow pattern from the motor section through the control valve section when the valve rotor is in the position of FIG. 8;

FIG. 12 is a somewhat schematic, sectional view illustrating a complete inlet and exhaust air cycle through the control valve and motor sections when the valve rotor is in the position of FIG. 8; and FIG. 13 is a developmental view illustrating the manner in which simultaneous flow of air through the air inlet and exhaust passages connecting the motor and valve chambers occurs.

Referring to the drawings, and particularly FIGS. 1 through 7, I show an embodiment of the principles of the present invention incorporated in a reversible air motor assembly generally indicated at 20 in FIG. 1 and formed by a housing generally indicated at 22 enclosing a handle section generally indicated at 24, a control valve section generally indicated at 26 and a motor section generally indicated at 28, all formed of appropriate materials well known to those skilled in the art. As stated, the particular embodiment illustrated and described herein is an air motor assembly, but it will be obvious from a more complete understanding of the present invention that the principles thereof are equally well applicable to fluid motor assemblies of various types and driven by other forms of fluid, all fully contemplated within the inventive concepts hereof.

The handle section 24 includes a selectively rotatable part 30 axially aligned with and abutting a fixed part 32, with both telescoping an axially extending air inlet tube 34, said tube being secured rotatable with the rotatable part 30 and within the fixed part 32. An air supply line 36 is connected to the rotatable part 30 communicating through a shutoff valve 38 with the air inlet tube 34. The shutoff valve 38 is of the normally closed, depressible plunger type, as best seen in FIGS. 1 and 3, having a reciprocal plunger 40 normally urged to closed position by a spring 42 and selectively depressible by an overlying actuating lever 44 pivotally mounted on the rotatable part 30.

The housing 22 at the point of enclosing the control valve and motor sections 26 and 28 is formed of an exterior part 46 and an interior part 48, fixed relative to each other by a pin 50, best seen in FIG. 2. The handle fixed part 32 is secured to the housing exterior part 46 through a series of bolts 52, with an inner end 54 of the air inlet tube 34 telescoped over a rearward extension 56 of a valve rotor 58 in the control valve section 26. The valve rotor 58 is secured to the inner end 54 of the air inlet tube 34 for rotation with said air inlet tube by a pin 60 so that rotation of the handle rotatable part 30 will rotate the air inlet tube 34 and thereby also rotate the valve rotor 58 within the control valve section 26.

The valve rotor 58 is rotatably contained within a valve chamber 62 of the control valve section 26, said valve chamber being formed by the housing interior part 48 and a valve port ring 64, said ring being secured to the housing interior part. Appropriate sealing rings 66 and 68 are provided for rotatably sealing the valve rotor 58 within the valve port ring 64 and the housing interior part 48, as shown in FIG. 2, and a positioning pin 70 is secured projecting from the housing interior part slidably received in a control slot 72 of the valve rotor for limiting the rotational movement of the valve rotor. Thus, the valve rotor 58 and, consequently, the handle rotatable part 30 are limited in rotation between the extremes of the rotor control slot 72 by the positioning pin 70, said positioning at said control slot extremes constituting first and second positions hereinafter more clearly defined.

The valve rotor 58 is formed with an axially extending air inlet passage 74 communicating outwardly with the inner end 54 of the air inlet tube 34 and communicating interiorly with a radially extending air directing passage 76, the latter being positioned in the valve rotor axially intermediate the valve port ring 64. The air directing passage 76 is also positioned within the valve rotor 58 circumferentially midway between circumferentially spaced and axially extending air exhaust channels 78 and 80. The valve port ring 64 is formed with a pair of air inlet ports 82 and 84 and a pair of air exhaust ports 86 and 88 which communicate radially outwardly respectively with a pair of axially extending air inlet passages 90 and 92 and a pair of axially extending air exhaust passages 94 and 96 formed in the housing interior part 48 extending axially to the separator plate 98 of the motor section 28, as best seen in FIG. 4.

As best seen in FIGS. 2 and 7, an annular air exhaust recess 100 is formed at the outer extremity of the valve port ring 64 between the valve rotor 58 and the housing interior part 48, with said recess providing communication into a pair of circumferentially spaced, oblong and axially extending air exhaust passages 102 and 104 in the housing interior part. The air exhaust passages 102 and 104 in turn communicate into an annular air exhaust chamber 106 formed between the housing exterior and interior parts 46 and 48, as best seen in FIGS. 2, 10 and 11. The air exhaust chamber 106 exhausts air to the atmosphere through a series of air exhaust ports 108 formed through the housing exterior part 46 radially outwardly of the handle fixed part 32, as shown in FIG. 2.

The various of the air directing passage 76, the air exhaust channel 78 and the air exhaust channel 80 in the valve rotor 58 are appropriately positioned, and the rotor control slot 72 is appropriately formed relative to the positioning pin 70 of the housing interior part 48 so that the valve rotor will direct inlet and exhaust air therethrough in a particular manner in particular positions of the valve rotor in order to control inlet air into and exhaust air from the motor section 28. When the valve rotor 58 is positioned with the air directing passage 76 intermediate the air inlet passages 90 and 92 there is no communication between the air directing passage and the air inlet passages so that there is no inlet air flowing into the motor section 28, such positioning of the valve rotor being shown in FIG. 4. As shown in FIG. 7, in this neutral positioning of the valve rotor 58, the positioning pin 70 is midway of the control slot 72.

Movement of the valve rotor 58 clockwise, as viewed in FIG. 7, until the positioning pin 70 contacts the right-hand extremity of the rotor control slot 72 places the rotor air directing passage 76 in communication with the housing air inlet passage 92, as shown in FIG. 8, while the valve rotor seals off the housing air exhaust passage 96. At the same time, such positioning of the valve rotor places the air exhaust channel 78 in communication with both of the housing air inlet passage 90 and the housing air exhaust passage 94, and also places the air exhaust channel 78 in communication with the housing air exhaust passage 102. Thus, inlet air flows forwardly through the valve rotor 58 and the single housing air inlet passage 92, as indicated by directional arrows 110 in FIG. 10, and exhaust air flows rearwardly through the valve rotor into the housing air exhaust passage 102 from both of the housing air inlet passage 90 and the housing air exhaust passage 94, the flow of exhaust air through the housing air exhaust passages 94 and 102 being indicated by directional arrows 112 in FIG. 11.

When the valve rotor 58 is rotated in the counterclockwise direction, as viewed in FIG. 7, until the housing positioning pin 70 is located at the left-hand extremity of the rotor control slot 72, the air directing passage 76 is in communication with the housing air inlet passage 90, while the valve rotor seals off the housing air exhaust passage 94, as shown in FIG. 9. At the same time, the rotor air exhaust channel 80 is in communication with both the housing air inlet passage 92 and the housing air exhaust passage 96, as well as the housing air exhaust passage 104. Thus, in this counterclockwise positioning of the valve rotor 58, inlet air flows through the valve rotor into the single housing air inlet passage 90, while exhaust air flows from both the housing air inlet passage 92 and the housing air exhaust passage 96 into the housing air exhaust passage 104.

Referring particularly to FIGS. 2, 5 and 6, a motor chamber 114 is formed within the motor section 28 by a motor ring 116 axially between the separator plate 98 and an end plate 118. A rotor 120 is mounted radially offset within the motor chamber 114 and rotatable on the separator plate 98 and the end plate 118, said rotor having radially reciprocal vanes 122 equally circumferentially spaced around said rotor. Furthermore, the rotor 120 rotatably drives a motor shaft 124 extending axially through the end plate 118.

All of the forward ends of the previously described housing air inlet and air exhaust passages 90 through 96 are enlarged in the manner illustrated in FIGS. 10 and 11, and the separator plate 98 is secured particularly positioned relative thereto and relative to the motor ring 116 by a pin 126 received axially through the separator plate and the motor ring. A pair of air inlet ports 128 and 130 are formed through the separator plate 98 communicating rearwardly with the enlarged forward end of the housing air inlet passage 90 and forwardly with an aligned pair of axially extending air inlet passages 132 and 134 in the motor ring 116. A similar pair of air inlet ports 136 and 138 are also formed through the separator plate 98 circumferentially spaced from the foregoing inlet ports and communicating rearwardly with the housing air inlet passage 92 and forwardly with an aligned pair of axially extending air inlet passages 140 and 142 in the motor ring 116.

Still further, a pair of air exhaust ports 144 and 146 are formed through the separator plate 98 circumferentially adjacent the air inlet ports 128 and 130, and a pair of air exhaust ports 148 and 150 are formed through said plate circumferentially adjacent the air inlet ports 136 and 138. The air exhaust ports 144 and 146 are axially aligned with the forward end of the housing air exhaust passage 94 and communicate forwardly with an aligned pair of air exhaust passages 152 and 154 in the motor ring 116. The air exhaust ports 148 and 150 are axially aligned with the forward end of the housing air exhaust passage 96 and communicate forwardly with a pair of aligned air exhaust passages 156 and 158 in the motor ring 116.

Thus, as seen in FIG. 6, the air inlet passages 132 and 134 and the air exhaust passages 152 and 154 are circumferentially adjacent in one quadrant of the motor ring 116, while the air inlet passages 140 and 142 and the air exhaust passages 156 and 158 are circumferentially adjacent in a different quadrant of the motor ring 116. Also, the various air inlet passages 132, 134, 140 and 142 are of smaller diameter than the various air exhaust passages 152 through 158.

As best illustrated in FIG. 2, the forward ends of the air inlet passages 140 and 142 terminate within the motor ring 116 at axially spaced locations and in the right-hand half of said motor ring, as viewed in FIG. 2. The forward ends of the air exhaust passages 156 and 158 similarly terminate within the motor ring 116 at axially spaced locations, but in the left-hand half of said motor ring, as viewed in FIG. 2. Also as illustrated in FIG. 2, the forward ends of the air inlet passages 140 and 142 communicate within the motor ring 116 with a pair of arcuate, circumferentially extending air inlet channels 160 and the forward ends of the air exhaust passages 156 and 158 with a pair of arcuate, circumferentially extending air exhaust channels extending a relatively minor circumferential distance and said air exhaust channels extending a relatively major circumferential distance, as illustrated in both FIGS. 2 and 6.

The forward ends of the air inlet passages 132 and 134 and the forward ends of the air exhaust passages 152 and 154 are similarly formed communicating with a pair of similar air inlet channels 164 and air exhaust channels 166. As is appropriate to the previously described locations of the air inlet passages 132, 134, 140 and 142 and the locations of the air exhaust passages 152 through 158, the air inlet channels 160 and 164 are in opposite halves of the motor ring 116 opening radially into the motor chamber 114, as best seen in FIG. 6, as are the air exhaust channels 162 and 166. Beyond the foregoing, the various air inlet and exhaust channels 160 through 166 and the overall construction of the rotor 120 with the vanes 122 are generally of usual form to provide a reversible, fluid driven motor within the motor section 28.

In operation, assume that it is desired to rotate the fluid driven motor, that is, the rotor 120 and motor shaft 124 in the clockwise direction, as viewed in FIG. 6, the valve rotor 58 is shifted to the position shown in FIGS. 8, 10 and 11. In this position, the air directing passage 76 of the valve rotor 58 communicates with the housing air inlet passage 92 while sealing off the housing air exhaust passage 96. Furthermore, the air exhaust channel 78 of the valve rotor 58 will be aligned communicating with both the housing air inlet and exhaust passages 90 and 94.

Upon opening of the shutoff valve 38 by depression of the actuating lever 44, driving air will therefore flow forwardly through the air inlet tube 34 into the air inlet passage 74 of the valve rotor 58, from the air directing passage 76 of the valve rotor into the housing air inlet passage 92, through the air inlet ports 136 and 138 of the separator plate 98 into the air inlet passages 140 and 142 of the motor ring 116, and into and from the air inlet channels 160 into the motor chamber 114. Such driving air entering the motor chamber 114 from the air inlet channels 160 will drive the rotor 120 in the clockwise direction, as shown in FIG. 6, while the air exhaust passages 156 and 158 in the motor ring 116 are maintained closed off by virtue of the valve rotor 58 sealing off the housing air exhaust passage 96, as previously described.

During rotation of the rotor 120 within the motor chamber 114 in the clockwise direction, the rotor vanes 122 will scoop exhaust air into both the air inlet channels 164 and air exhaust channels 166 at the opposite side of the motor ring 116. This exhaust air will flow from the air inlet and exhaust channels 164 and 166 into all of the air inlet and exhaust passages 132, 134, 152 and 154, through all of the air inlet and exhaust ports 128, 130, 144 and 146 in the separator plate 98, through both of the housing air inlet and exhaust passages 90 and 94, through the air exhaust channel 78 in the valve rotor 58, through the housing air exhaust recess 100 and the air exhaust passage 104 into the air exhaust chamber 106, and finally from the housing 22 through the air exhaust ports 108 into the atmosphere.

The developmental view showing of FIG. 13 illustrates the axial locations and circumferential extent of the various air inlet and exhaust passages 132, 134, 152 and 154 in the motor section 28, and the various air inlet and exhaust channels 164 and 166 in said motor section. As shown in FIG. 13, the various air inlet and exhaust passages 132, 134, 152 and 154 are indicated as being interconnected within the motor ring 116, a further important feature of the fluid driven motor of the present invention more clearly illustrated in FIG. 12 and to be discussed in detail relative to FIG. 12 hereinafter. Of importance to the present discussion, is the fact that exhaust air from the motor chamber 114 exhausts simultaneously into all of the air inlet and exhaust chambers 164 and 166 and through all of the air inlet and exhaust passages 132, 134, 152 and 154, the air inlet and exhaust channels 164 and 166 being axially spaced along the axial extent of the motor chamber 114, as shown, so as to provide ease of exit of the exhaust air from the motor chamber to accomplish even more efficient back pressure reduction.

Thus, according to the principles of the present invention, driving air is admitted into the motor chamber 114 through only the single air inlet passage means in the form of the pair of air inlet passage 140 and 142, while exhaust air is carried from the motor chamber by means of double passage means in the form of both the pairs of air inlet passages 132 and 134 and air exhaust passages 152 and 154. The air exhaust passage means from the motor chamber 114 is therefore of much greater capacity than the air inlet passage means for said motor chamber so as to greatly reduce, if not completely eliminate, the back pressure encountered in the prior fluid driven motor constructions. A much more efficient fluid driven motor is thereby provided according to the principles of the present invention.

Reversal of the fluid driven motor for rotation of the rotor 120 in the counterclockwise direction, as viewed in FIG. 6, is accomplished by shifting the valve rotor 58 to the position shown in FIG. 9 and results in driving air being admitted into the motor chamber 114 through the pair of air inlet passages 132 and 134, while the pair of air exhaust passages 152 and 154 are sealed off, and exhaust air being transmitted from the motor chamber through both pairs of air inlet and exhaust passages 140, 142, 156 and 158, the result being exactly the same as that just described, only in the opposite direction of rotation of the rotor 120. The shifting of the valve rotor 58 is accomplished, of course, by the rotatable movement of the handle rotatable part 30 relative to the handle fixed part 32, as previously described.

In order that a more clear understanding of the principles of the present invention may be had, I have somewhat diagrammatically illustrated in simplified form the control valve and motor sections 26 and 28 of the embodiment of the air motor assembly 20 in FIG. 12, wherein the valve rotor 58 is shifted to the position for driving the rotor 120 in the clockwise direction, as viewed from the handle section end of the assembly and as indicated by a directional arrow 168. In the showing of FIG. 12, all of the air inlet passages 92, 140 and 142 have been combined into a single continuous air inlet passage 170, all of the air exhaust passages 96, 156 and 158 into a single continuous air exhaust passage 172, all of the air inlet passages 90, 132 and 134 into a single continuous air inlet passage 174, and all of the air exhaust passages 94, 152 and 154 into a single continuous air exhaust passage 176. Also, for maximum efficiency and maximum elimination of back pressure within the motor chamber 114, the air inlet and exhaust passages 170 and 172 are permanently connected in communication within the motor section 28 by a connecting air passage 178, and air inlet and exhaust passages 174 and 176 by a similar connecting air passage 180, said connecting passages being important to the principles of the present invention.

As shown in FIG. 12, with the valve rotor 58 shifted for the clockwise rotation of the rotor 120, driving air is admitted through the shutoff valve 38, through the air inlet tube 34 of the handle section 24 and into the valve air inlet passage 74 of the control valve section 26, as indicated by directional arrows 182. From the valve air inlet passage 74, the driving air flows through the air directing passage 76, as indicated by directional arrow 184, through the air inlet passage 170, as indicated by directional arrow 186 and into the motor chamber 114, as indicated by directional arrow 188. No driving air is admitted through the air exhaust passage 172 in view of the sealing off thereof by the valve rotor 58 and the flow of driving air in the air inlet passage 170 will not be disturbed by the connection thereof to the air exhaust passage 172 by the connecting air passage 178 due to said sealing off of the air exhaust passage 172.

Exhaust air will flow from the motor chamber 114 through both the air inlet and exhaust passages 174 and 176, as indicated by directional arrows 190 and 192, through the air exhaust channel 78 of the valve rotor 58, as indicated by directional arrows 194 and 196, and into and from the air exhaust passage 102, as indicated by directional arrows 198. During the flow of exhaust air through the air inlet and exhaust passages 174 and 176, a part thereof will also flow between said air inlet and exhaust passages through the connecting air passage 180, as indicated by directional arrows 200.

Thus, the motor chamber 114 is fed driving air through a single air inlet passage 170, while exhaust air is transmitted from the motor chamber through both the air inlet and exhaust passages 174 and 176, thereby reducing back pressure of the exhaust air within the motor chamber. Furthermore, the permanent interconnection between the air inlet and exhaust passages 174 and 176 by the connecting air passage 180 will tend to equalize the exhaust air flow in the air inlet and exhaust passages 174 and 176 to even further reduce the back pressure of the exhaust air and increase the efficiency of the fluid driven motor of the present invention.

I claim:

1. In a selectively reversible fluid driven motor, the combination of: a housing; a fluid driven rotary motor in said housing including a motor chamber enclosing a rotor adapted to be rotated in either direction of rotation; a valve movable between first and second positions; fluid inlet means for directing driving fluid to said valve; fluid exhaust means for directing exhaust fluid from said valve; first fluid passage means for directing driving fluid from said fluid inlet means through said valve and to said motor chamber to drive said rotor in one direction of rotation when said valve is in said first position, said first fluid passage means directing exhaust fluid from said motor chamber through said valve and to said fluid exhaust means when said valve is in said second position and said rotor is driven in the other direction of rotation; second fluid passage means for directing exhaust fluid from said motor chamber through said valve and to said fluid exhaust means when said valve is in said second position and said rotor is driven in said other direction of rotation, said second fluid passage means being sealed off at said valve free of directing driving fluid from said fluid inlet means through said valve and free of directing exhaust fluid from said motor chamber through said valve when said valve is in said first position; third fluid passage means for directing driving fluid from said fluid inlet means through said valve and to said motor chamber to drive said rotor in said other direction of rotation when said valve is in said second position, said third fluid passage means directing exhaust fluid from said motor chamber through said valve and to said fluid exhaust means when said valve is in said first position and said rotor is driven in said one direction of rotation, said fourth fluid passage means for directing exhaust fluid from said motor chamber through said valve and to said fluid exhaust means when said valve is in said first position and said rotor is driven in said one direction of rotation, said fourth fluid passage means being sealed off at said valve free of directing driving fluid from said fluid inlet means through said valve and free of directing exhaust fluid from said motor chamber through said valve when said valve is in said second position.

2. A fluid driven motor as defined in claim 1 in which said first and second fluid passage means direct said exhaust fluid from said motor chamber at axially spaced locations along said motor chamber; and in which said third and fourth fluid passage means direct said exhaust fluid from said motor chamber at axially spaced locations along said motor chamber, said third and fourth fluid passage means locations being circumferentially spaced along said motor chamber from said first and second fluid passage means locations.

3. A fluid driven motor as defined in claim 1 in which said first and second fluid passage means are permanently connected in fluid communication at a location between said valve and said motor chamber; and in which said third and fourth fluid passage means are permanently connected in fluid communication at a location between said valve and said motor chamber.

4. A fluid driven motor as defined in claim 1 in which said first and second fluid passage means direct said exhaust fluid from said motor chamber at axially spaced locations along said motor chamber; in which said third and fourth fluid passage means direct said exhaust fluid from said motor chamber at axially spaced locations along said motor chamber, said third and fourth fluid passage means locations being circumferentially spaced along said motor chamber from said first and second fluid passage means locations; in which said first and second fluid passage means are permanently connected in fluid comunication at a location between said valve and said motor chamber; and in which said third and fourth fluid passage means are permanently connected in fluid communication at a location between said valve and said motor chamber.

5. A fluid driven motor as defined in claim 1 in which said valve includes a rotary valve body rotatable between said valve first and second positions and directing said fluid therethrough to and from the appropriate of said passage means, said valve body sealing off said second and fourth fluid passage means in said first and second positions respectively.

6. A fluid driven motor as defined in claim 1 in which said valve is in said housing and includes a rotary valve body rotatable between said valve first and second positions and directing said fluid therethrough to and from the appropriate of said passage means, said valve body sealing off said second and fourth fluid passage means in said first and second positions respectively; and in which said first, second, third and fourth fluid passage means are incorporated in said housing.

7. A fluid driven motor as defined in claim 1 in which said valve is in said housing and includes a rotary valve body rotatable between said valve first and second positions and directing said fluid therethrough to and from the appropriate of said passage means, said valve body sealing off said second and fourth fluid passage means in said first and second positions respectively; in which said first, second, third and fourth fluid passage means are incorporated in said housing; in which said first and second fluid passage means direct said exhaust fluid from said motor chamber at axially spaced locations along said motor chamber; in which said third and fourth fluid passage means direct said exhaust fluid from said motor chamber at axially spaced locations along said motor chamber, said third and fourth fluid passage means locations being circumferentially spaced along said motor chamber from said first and second fluid passage means locations; in which said first and second fluid passage means are permanently connected in fluid communication at a location between said valve and said motor chamber; and in which said third and fourth fluid passage means are permanently connected in fluid communication at a location between said valve and said motor chamber.

8. In a selectively reversible fluid driven motor, the combination of: a housing incorporating a valve chamber and a motor chamber, fluid inlet means for directing driving fluid into said housing and to said valve chamber, fluid exhaust means for directing exhaust fluid from said valve chamber and from said housing; a fluid driven rotary member in said motor chamber adapted to be rotated in either direction of rotation; a first pair of fluid passage means between said valve and motor chambers; a second pair of fluid passage means between said valve and motor chambers; first fluid directing means arranged for alternately directing driving fluid from at least one of said first pair of fluid passage means into said motor chamber to rotate said rotary member in one direction of rotation and directing exhaust fluid from said motor chamber into both of said first pair of fluid passage means when said rotary member is rotated in the opposite direction of rotation; second fluid directing means arranged for alternately directing driving fluid from at least one of said second pair of fluid passage means into said motor chamber to rotate said rotary member in said opposite direction of rotation and directing exhaust fluid from said motor chamber into both of said second pair of fluid passage means when said rotary member is rotated in said one direction of rotation; and a valve body in said valve chamber movable between first and second positions, driving fluid directing means for alternately directing driving fluid from said fluid inlet means into said one of said first pair of fluid passage means while being free of directing said driving fluid into the other of said first pair when said valve body is in said first position and directing driving fluid from said fluid inlet means into said one of said second pair of fluid passage means while being free of directing said driving fluid into the other of said second pair when said valve body is in said second position, said valve body sealing off said other of said first pair of fluid passage means at said valve body when said valve body is in said first position and sealing off said other of said second pair of fluid passage means at said valve body when said valve body is in said second position, exhaust fluid directing means for alternately directing exhaust fluid from both of said second pair of fluid passage means into said fluid exhaust means when said valve body is in said first position and directing exhaust fluid from both of said first pair of fluid passage means into said fluid exhaust means when said valve body is in said second position.

9. A fluid drive motor as defined in claim 8 in which said first fluid directing means is operably connected for directing said exhaust fluid from said motor chamber into said one of said first pair of fluid passage means at a location along said motor chamber axially spaced from a location of the other of said first pair; and in which said second fluid directing means is operably connected for directing said exhaust fluid from said motor chamber into said one of said second pair of fluid passage means at a location along said motor chamber axially spaced from a location of the other of said second pair, said second pair locations being circumferentially spaced along said motor chamber from said first pair locations.

10. A fluid driven motor as defined in claim 8 in which said first pair of fluid passage means are permanently connected in fluid communication at a location between said valve and motor chambers; and in which said second pair of fluid passage means are permanently connected in fluid communication at a location between said valve and motor chambers.

11. A fluid driven motor as defined in claim 8 in which said first fluid directing means is operably connected for directing said exhaust fluid from said motor chamber into said one of said first pair of fluid passage means at a location along said motor chamber axially spaced from a location of the other of said first pair; in which said second fluid directing means is operably connected for directing said exhaust fluid from said motor chamber into said one of said second pair of fluid passage means at a location along said motor chamber axially spaced from a location of the other of said second pair, said second pair locations being circumferentially spaced along said motor chamber from said first pair locations; in which said first pair of fluid passage means are permanently connected in fluid communication at a location between said valve and motor chambers; and in which said second pair of fluid passage means are permanently connected in fluid communication at a location between said valve and motor chambers.

12. A fluid driven motor as defined in claim 8 in which said valve body is a rotatable valve body rotatably movable in said valve chamber between said first and second positions; in which said first fluid directing means is operably connected for directing said exhaust fluid from said motor chamber into said one of said first pair of fluid passage means at a location along said motor chamber axially spaced from a location of the other of said first pair; in which said second fluid directing means is operably connected for directing said exhaust fluid from said motor chamber into said one of said second pair of fluid passage means at a location along said motor chamber axially spaced from a location of the other of said second pair, said second pair locations being circumferentially spaced along said motor chamber from said first pair locations; in which said first pair of fluid passage means are permanently connected in fluid communication at a location between said valve and motor chambers; and in which said second pair of fluid passage means are permanently connected in fluid communication at a location between said valve and motor chambers.

References Cited

UNITED STATES PATENTS

| | | | |
|---|---|---|---|
| 1,305,345 | 6/1919 | Dunfee | 91—140 |
| 2,159,232 | 5/1939 | Shaff | 91—138 X |
| 2,504,441 | 4/1950 | Mitchell | 91—121 X |
| 2,636,513 | 4/1953 | Schmid | 91—121 X |
| 2,980,078 | 4/1961 | Conover | 91—138 |
| 3,190,183 | 6/1965 | Walker et al. | 91—121 X |
| 3,238,848 | 3/1966 | Bent | 91—138 |
| 1,805,023 | 5/1931 | Springsteen | 91—140 X |
| 3,241,457 | 3/1966 | Reed | 91—138 X |

EVERETTE A. POWELL, JR., *Primary Examiner.*

U.S. Cl. X.R.

91—138, 140